United States Patent Office 3,063,851
Patented Nov. 13, 1962

3,063,851
CEMENT BASE PAINTS, ETC.
Ralph E. Madison, Detroit, Mich., assignor to Devoe & Raynolds Company, Inc., Louisville, Ky., a corporation of New York
No Drawing. Continuation of application Ser. No. 519,671, July 1, 1955. This application Jan. 18, 1960, Ser. No. 2,819
8 Claims. (Cl. 106—93)

This invention relates to improvements in cement base paints and their manufacture and the waterproofing of masonry walls, etc., therewith.

The improved cement base paints of the present invention contain Portland cement as their principal constituent admixed with a non-aqueous vehicle, made up of a small amount of resin dissolved in an organic solvent, sufficient to give painting consistency, and with an amount of resin sufficient to give the proper consistency but insufficient to prevent hydration of the Portland cement after the paint is applied and the organic solvent is removed by evaporation; whereby the non-aqueous paint composition can be applied to masonry and other surfaces, followed by drying to remove the organic solvent and hydration with water to set the cement.

The improved process of the present invention is one in which the Portland cement is combined with such a non-aqueous vehicle and the resulting paint applied to the masonry walls or other surfaces, followed by evaporation of the solvent and hydration of the cement by the addition of water.

Heretofore it has been the custom to use Portland cement in forming cement base paints by using Portland cement, usually white, in combination with lime, accelerators such as calcium chloride, and coloring materials, by milling or mixing these ingredients together in a dry form and mixing the resulting powder with water in order to produce a fluid material or paint which can then be applied to a masonry surface by conventional painting means, such as a brush, roller or spray. Prior to the actual application of such paints, it is necessary to soak or practically saturate the masonry surface with water so that, during application of the paint, the water used in it to produce a fluid mixture will not be too quickly absorbed or lost by absorption in the masonry surface to which the application is being made. And after application, it is necessary to spray the applied coating with water in order to "cure" it, since Portland cement, being a hydraulic cement, requires water for hardening.

The improved cement base paint of the present invention, in which the Portland cement and other dry ingredients are mixed with a non-aqueous vehicle, can be applied to a masonry surface without tthe necessity of prewetting the surface with water, and without the presence of water in the paint when it is applied. The improved paint is also one in which setting of the cement in the paint does not take place before or during application of the paint to the surface. The curing of the coating resulting from the application of the paint, after the evaporation of the organic solvent, is effected by the application of water. The improved paint of the present invention has the advantage that it can be applied at low temperature and with a high degree of waterproofing.

Cement base paints are commonly used to waterproof open-textured masonry walls made from concrete block, cinder block, etc. In making cement base paints by admixture of the Portland cement, etc. with water, it is necessary to use a much larger amount of water to make the paint than is required in the production of the concrete structures to be waterproofed. When mass concrete is made with the use of Portland cement, the amount of water used in a typical mix is usually kept within the range of 5–7 gallons (40–56 pounds) of water per bag of cement, which weighs 94 pounds, with the lower amount of water producing the densest concrete and a concrete most resistant to the passage of water. In contrast with this, a cement base paint made with water usually requires at least 3 quarts (6 pounds) of water per 8–10 pounds of inorganic base, of which about 80% is cement; so that, for a paint made with a bag of 94 pounds of cement, a water content of around 9–11 gallons (72–88 pounds) is required. This amount of water is considerably in excess of that actually taken up by the cement in the hydration or curing process; and as a result the waterproofing value of the cement si considerably weakened or lessened; while the evaporation of the excess water tends to produce voids or porosity in the set product which permit the future passage of water.

According to the present invention, no water is used in the preparation of the paint, nor is water present during its application. When the new paint in a non-aqueous vehicle is applied and the solvent evaporates, the composition seems to be drawn into the pores and toward the base of the pores in the material coated and to consolidate and pack in these pores. It appears that during the evaporation process, when the organic solvent is removed, the remaining film seems to squeeze together to make a dense block or layer or dry Portland cement, admixed with a small amount of resin, in the bottoms of the openings in the masonry.

The absence of water in the cement paint when it is applied and the organic solvent is removed therefrom eliminates the formation of colloid or gel such as is caused or promoted by the presence of the excess water in water base paints, which colloids or gels, when formed, and upon the release of water therefrom, tend to leave behind a relatively infirm structure disposed to cracking and pinholing. Consequently, when the evaporation of the water from the water base paint after application is complete, the remaining film is not compacted or consolidated and thus there will be many pores or voids through which the water escapes. In contrast with such action, the improved cement base paint of the present invention is one in which the application and removal of the organic solvent takes place without hydration of the cement and with consolidation of the remaining film in the openings in the masonry.

The curing of Porland cement is a combination of hydration hydrolysis, with limited colloid development. In other words, water will hydrolyze the tricalcium silicate to dicalcium silicate with the formation of lime. The dicalcium silicate will then hydrate and begin to produce the crystal structure which is the basis for strength development. In combination with this action, there is a certain amount of colloid or non-crystalline development which takes place within the crystal lattice. Both actions, namely, crystal growth and limited colloid development, produce the final strength characteristics of Portland cement. With water base paints, where the cement is overwatered by virtue of the high amount of water required for mixing, these reactions begin before and during the application of the water base paint and continue after it is applied. If too much colloid is developed, not only will there be less formation of strong crystals, but the condition necessary for the limited and proper development of the colloid within the crystal lattice will not be obtained. In other words, there will be free and uncontrolled colloids which will be porous and low in strength.

In contrast with the action which takes place with such water base paints, the composition of the present invention is one in which no water is used during the deposit of the cement or prior to the removal of the organic solvent, so that curing action on the cement is obviated until after it has been applied and the organic solvent removed. Consequently, when curing water is applied to the resulting film, after the organic solvent has been removed, the curing water will immediately begin to react with the cement in the most advantageous manner; and the curing action can proceed with proper development of crystal and limited colloid. Since the cement has been deposited or drawn into the pores, without water, the effect of the subsequent curing, which is completely in situ, is one in which advantage is taken of the fact that there is an expansive action upon hydration which tends to lock the material tightly in the pores and openings and to give a coating which resists the passage of water through the film. Portland cement, when properly cured, will normally take up by hydration approximately 35% of its weight of water. And when this curing is prevented until the cement paint has been applied and the organic solvent removed, this hydration will take place in such a manner that the expansion and setting gives an effective waterproofing action.

In making the new compositions of the present invention, the Portland cement is suspended in an organic vehicle, using Portland cement alone or advantageously with the addition of other ingredients which are admixed therewith in making Portland cement base paints, such as a small amount of mason's lime, aluminum stearate, calcium chloride, inorganic coloring materials and special forms of silica or silicates.

In the inorganic admixtures thus formed, the Portland cement is the major component, amounting usually to about 80% of the total weight of inorganic constituents, with the lime being usually not more than 15% of the weight of the cement, the stearate being approximately 0.2–0.5% of the combined weight of lime and cement, the calcium chloride being approximately 2–5% of the combined weight of lime and cement, the coloring materials being approximately 1–5% of the total weight, and the siliceous material being approximately 0–20%, as a typical combination. The lime is useful in producing a whiter material when dry; the aluminum stearate is used to aid in suspension of the ingredients in the organic vehicle, and also to enhance the water-repellent properties of the product; the calcium chloride is a curing agent to aid in curing of the cement; the use of the coloring material is to give the paint coating the desired color; and the siliceous material, sand, diatomaceous silica, powdered silica, pumicite, etc. is used for body and filling, and puzzolanic action in the case of diatomaceous silica and pumicite.

The organic vehicle used with the Portland cement in making the new non-aqueous compositions is made by dissolving a resin in an organic solvent in proportions which, with the cement, will form a paint of proper consistency. In general, the amount of such organic vehicle is much less than the amount of the cement with which it is admixed. And the amount of resin should be a small percentage, within the range e.g. of 1½–5% of the weight of the cement or of the inorganic constituents. The amount of resin and resin solution should be such as to give proper consistency and adhesion to the paint, but should not be sufficient to prevent hydration of the cement after the paint is applied and the organic solvent is removed by evaporation.

Different resins can be used, including unsaponifiable and saponifiable resins, and a mixture of unsaponifiable and saponifiable resins, which, in solution in an organic solvent, give the proper working and binding qualities. It is desirable but not necessary that the resin or a portion of the resin be of such a type that when dissolved in its solvent it appears to be "gel-like," or imparts thixotropic properties to the paint. Thus, the resins or polymers can be selected from the class of butadiene-styrene resins, polyethylene, ethyl cellulose, chlorinated rubber, natural rubber, hydrocarbon resins, ethyl hydroxy ethyl cellulose, vinyl resins, acrylic resins, alkyd resins, etc.

The solvents used for the resins are organic solvents in which the resins are soluble and will vary with different resins, for example, mineral spirits, xylene, toluene, alcohols, ketones, esters, etc.

The proportion of resin to Portland cement, or to admixed inorganic base containing Portland cement, will vary somewhat with different resins and the properties desired in the paint, such as consistency, but normally will fall within the range of about 1½–5% of resin based on the weight of the total inorganic constituents including Portland cement as the principal inorganic constituent. Thus, where the Portland cement is 80% of the inorganic constituents, the range is about 1.87% to 6.25% of resin based on the Portland cement. Where the Portland cement is 85% of the inorganic constituents, as in the following examples, this range is about 1.75% to 5.9% of resin based on the Portland cement. When the solvent is removed, the paint residue will contain around 95% or somewhat more inorganic materials and around 75% or more of Portland cement.

The lower limit of resin in the paints is that which will give a vehicle with sufficient binding and carrying properties to hold the inorganic ingredients in proper form for packaging and application, and will in general be around 1½%, more or less. The upper limit is an amount which will not seriously affect the normal hydrating action of the cement, when the organic solvent is removed and water is applied to effect hydration. This upper limit is advantageously around 5% based on the total weight of the inorganic material. If too much resin is used, to prevent proper access of water to the cement to hydrate it, the cement will remain as a non-reacting powder, as in the case of conventional paint coatings containing resin or oil solutions and conventional paint pigments. The upper limit of the amounts of individual resins can be readily determined by test and should be less than that which will interfere with proper hydration by water after the evaporation of the solvent. If too little resin is used, much less than 1½% based on the weight of the inorganic material, there may not be enough viscosity or binding qualities to produce a smooth working composition. Proportions of resin, e.g., around 2½%, or 2 to 5%, based on the inorganic material, are advantageously used.

When the Portland cement is 80% of the inorganic constituents, 2% of resin based on the inorganic material is about 2.5% based on the Portland cement; and 2½% based on the inorganic material is a little more than 3% based on the Portland cement. Where the Portland cement is 85% of the inorganic material, as illustrated by the following examples, the percentage of resin based on the Portland cement is about 2.35% or 2.95% respectively, corresponding to 2% and 2½% based on the inorganic materials.

With these small percentages of resin, when the paint is applied and the organic solvent evaporated, the residue will contain only about 5% or somewhat less of the resin and around 95% or somewhat more of inorganic material, of which at least about 75% will be Portland cement.

A test readily applied in determining the properties of the new paints is to apply them to cement asbestos board, allowing them to dry until free from solvent, and then placing them in water so that the applied film is submerged half way, then removing them from the water after 24 hour and allowing them to dry thoroughly for about 18 hours. The test boards are then totally submerged in the solvent originally used in the respective compositions. At the end of approximately one hour, the composition is then treated by lightly brushing the whole surface with the solvent. From the portions of the board which have not been cured by treatment with water, the solvent removes the composition. But the solvent does not remove the composition where it is cured by treatment with water. The upper limit of resin which can be used without interfering with the subsequent hydration can readily be determined in this way. When the resin reaches the amount where, after removal of the solvent and treatment with water, the subsequent treatment with the solvent and brushing removes the composition from both portions of the board, this indicates that the amount of resin has been sufficient to interfere with the normal hydration process.

In general, the total amount of organic vehicle, i.e., resin and organic solvent, is relatively small in proportion to the inorganic base. Thus, with an amount of resin corresponding to about 2½% of the weight of the inorganic base, the amount of solvent may vary from an amount comparable with the amount of inorganic base to an amount which may be as low as 20–25% of the weight of the inorganic base, and advantageously the amount of solvent is less than 50% by weight of the weight of the inorganic base. The amount of solvent will vary with the resin or resins used and also with the solvent, and also to some extent with the consistency of the resulting paint.

The new paints are advantageously made of a consistency similar to that of a creamy cement sand mortar. In this form, they can be easily worked into the openings in open textured masonry. Paint of such a consistency can be readily applied by a brush similar to any scrub brush, but with longer Tampico fibers and with the tufts closer together. In this way, the paint can be scrubbed into the surface so as to force as much as possible into the openings. The paint can vary somewhat in consistency and, depending on the consistency, can be applied by conventional painting means such as a brush roller or spray. An advantageous consistency is the range of approximately 110–115 Krebs units. Slightly more or slightly less consistency can be produced by varying the total amount of solvent.

After the paint has been thus applied to the surface, a drying period is allowed, sufficient to evaporate the solvent, after which the film is cured by spraying with or applying water until the film becomes well set.

The new paint composition can have included therein a small amount of fibers such as asbestos fibers to provide certain characteristics such as heavier consistency, to aid in preventing of settling, etc. In general, the amount of fiber when used is approximately 1–1½% of the total weight of the inorganic base.

The paint composition of the present invention has the advantage that, because it is free from water, hydration of the cement is prevented, and the composition can be prepared and stored and shipped in final form ready for use.

With some of the resins, which are readily soluble in organic solvents, the resin can be admixed in a dry pulverulent state with the dry Portland cement or inorganic mixture and shipped as a dry mixture, in closed containers which protect the powder from contact with the air. And the solvent can be separately supplied and added to the paint and mixed at the time and place of use. In this case, the cement and resin are mixed together in a dry form, and the solvent in proper amount is added and the mixture stirred until the resin dissolves.

In making the new compositions, instead of using Portland cement alone as the inorganic material, it is advantageously mixed with other inorganic constituents, as above indicated. The following example is illustrative of an inorganic base mixture with Portland cement as its principal constituent. And this mixture of ingredients will be referred to as the "inorganic base" in the following examples. This is conveniently made by mixing together in a Simpson or Lancaster mixer, in dry form, the following ingredients:

| | Parts |
|---|---|
| White Portland cement | 85 |
| Mason's lime | 10 |
| Powdered calcium chloride | 2.0 |
| Aluminum stearate powder | .20 |
| Titanium dioxide | 2.80 |
| | 100.00 |

The following examples illustrate the use of the above "inorganic base" with various resins dissolved in suitable solvents. The resin solution are combined with the inorganic base by mixing in a suitable vessel, or by shaking on a vibrator mixing apparatus with the ingredients placed in a suitable container. The final consistency of the paint can be controlled by further additions of solvents when necessary. The parts of the following examples are by weight.

*Example 1.*—The resin used was a hydrocarbon resin sold under the trade name Pliolite NR, obtained by treating a benzol solution of rubber with chlorostannic acid. 4 parts of this resin and 1 part of pale crepe rubber (milled) were dissolved in 85 parts of mineral spirits, and the resulting solution admixed with 200 parts of the above inorganic base to form the paint.

*Example 2.*—The resins used in this example were resins sold under the trade name Pliolite S–3 and Pliolite S–5, which are butadiene-styrene copolymers with a high styrene content. 3½ parts of Pliolite S–5 and 1½ parts of Pliolite S–3 were dissolved in 65 parts of xylene, and the resulting solution admixed with 200 parts of the above inorganic base to form the paint.

*Example 3.*—The resin used was an acrylic ester polymer with a molecular weight in the range of 50,000 to 75,000. 5 parts of this resin were dissolved in 698.8 parts of xylene and the resulting solution mixed with 200 parts of the above inorganic base to form the paint.

*Example 4.*—The resin used was the resin sold under the trade name Marbon Resin 11,952, a styrene butadiene copolymer resin with a high styrene content. 5 parts of this resin were dissolved in 45 parts of mineral spirits and the resulting solution admixed with 200 parts of the above inorganic base to form the paint.

*Example 5.*—The resin used was a styrene-butadiene copolymer sold under the trade name Marbon Resin 9200 LLV. 5 parts of this resin were dissolved in 84 parts of mineral spirits and the resulting solution admixed with 200 parts of the above inorganic base to form the paint.

A similar paint was made by dissolving 5 parts of the same resin in 65 parts of xylene and admixing the resulting solution with 200 parts of the inorganic base to make the paint.

*Example 6.*—5 parts of chlorinated rubber resin (sold under the trade name Parlon, 125 cps.) were dissolved in 85 parts of xylene and the resulting solution admixed with 200 parts of the above inorganic base to form the paint.

*Example 7.*—5 parts of natural rubber, pale crepe, were dissolved in 121.7 parts of mineral spirits and the resulting solution admixed with 200 parts of the above inorganic base to form the paint.

*Example 8.*—5 parts of the resin sold under the name Pliolite NR, referred to in Example 1, were dissolved in 75 parts of mineral spirits, and the resulting solution admixed with 200 parts of the above inorganic base to form the paint.

*Example 9.*—The resin used was the resin sold under the trade name Vinyl Resin VAGH, which is a partially hydrolyzed copolymer of vinyl chloride and vinyl acetate with a vinyl chloride content of about 91% and is permanently thermoplastic, neutral, non-oxidizing and non-heat reactive. 5 parts of this resin were dissolved in 32.5 parts of methyl ethyl ketone, and the resulting solution admixed with 200 parts of the above inorganic base to form the paint.

*Example 10.*—5 parts of ethyl hydroxy ethyl cellulose were dissolved in 195 parts of xylene and the resulting solution admixed with 200 parts of the above inorganic base to form the paint.

*Example 11.*—5 parts of ethyl hydroxy ethyl cellulose were dissolved in 55 parts of methyl ethyl ketone and the resulting solution admixed with 200 parts of the above organic base to form the paint.

*Example 12.*—5 parts of ethyl cellulose (Ethocel LV) were dissolved in a solvent mixture made up of 47.5 parts of mineral spirits and 47.5 parts of xylene, and the resulting solution admixed with 200 parts of the above inorganic base to form the paint.

*Example 13.*—4 parts of Goodyear Pliolite NR, unmilled, as described in Example 1, and 1 part of ethyl hydroxy ethyl cellulose were dissolved in a solvent mixture made up of 9 parts of xylene and 61 parts of mineral spirits, and the resulting solution admixed with 200 parts of the above inorganic base to make the paint.

The following examples illustrate paints made with Portland cement without the other admixtures contained in the above inorganic base.

*Example 14.*—5 parts of alkyd resin, long oil bodied soya type, were dissolved in 79.5 parts of mineral spirits, and the resulting solution admixed with 200 parts of Portland cement to form the paint.

*Example 15.*—5 parts of styrenated alkyd resin (American Cyanamid NOS 101-1) were dissolved in 50.5 parts of xylol and the resulting solution admixed with 200 parts of cement to make the paint.

*Example 16.*—4 parts of Pliolite NR resin, as described in Example 1, and 1 part of limed rosin (5% lime) were dissolved in 55 parts of mineral spirits and the resulting solution admixed with 200 parts of cement to make the paint.

*Example 17.*—4 parts of Pliolite NR resin, as described in Example 1, and 1 part of ester gum, were dissolved in 77.97 parts of mineral spirits, and the resulting solution admixed with 200 parts of cement to form the paint.

*Example 18.*—4 parts of Pliolite NR (see Example 1) and 1 part of rosin were dissolved in 49.3 parts of mineral spirits and the resulting solution admixed with 200 parts of cement to make the paint.

*Example 19.*—The resin used was a chlorinated rubber resin sold under the trade name Parlon (a 20% solution in toluene at 25° C. having a viscosity of 125 c.p.s.).

4 parts of this resin and 1 part of limed rosin (5% lime) were dissolved in 59 parts of xylol, and the resulting solution admixed with 200 parts of cement to form the paint.

*Example 20.*—4 parts of the Parlon resin described in the preceding example and 1 part of long oil soya alkyd resin (24.4% of phthalic anhydride) were dissolved in 55 parts of xylol, and the resulting solution admixed with 200 parts of cement to form the paint.

In the above examples, the resin is dissolved in the solvent to form the vehicle before admixture with the cement or inorganic base. The new paints can also be made at or prior to the time of use by supplying the cement or inorganic base admixed with finely divided resin in the form of a dry mix and separately supplying the solvent and adding the solvent to dissolve the resin and form the paint.

The following examples illustrate the carrying out of the invention in this way:

*Example 21.*—200 parts of cement were admixed with three parts of Pliolite NR resin, as described in Example 1, to form a dry mix.

The paint was made by adding 78.2 parts of mineral spirits to this dry mix and stirring until solution of the resin was completed.

A similar mixture was made using 200 parts of the cement with 5 parts of the Pliolite NR resin in finely divided form to form a dry mixture. And the paint was made by adding 90 parts of mineral spirits to this dry mixture and stirring until the resin was dissolved to form the paint ready for use.

*Example 22.*—A dry mix was made by adding 3 parts of Parlon, as described in Example 19, to 200 parts of cement to form a dry mix and by adding 90 parts of xylol to this dry mix to dissolve the resin and form the paint.

A modified mixture was made by adding 5 parts of the same resin to 200 parts of cement to form a dry mix and by adding 95 parts of xylol to the dry mix to dissolve the resin and form the paint.

A typical test which has been applied for showing the effectiveness of the cement base paints was as follows:

Standard cinder blocks were prepared by plugging the lower ends of the open chambers with mortar. The cement base paint was then brushed on, in one full saturating coat, in the proportion of about 1 gallon to 70 square feet, and applied to the bottom, sides and ends of the block, but not to the top. The paint was applied and the organic solvent evaporated and the coating was then cured by spraying with water and continuing until the film became well set.

After this curing of the coating, the open chambers of the blocks were filled with water. When the new paints of the present invention were applied and subjected to this test, no water passed through the surface of the blocks, even after water had been kept in the blocks for a considerable period of time, in some cases even after many months. With blocks which were not so coated, the water poured into the open chambers of the block readily ran out through the sides of the block.

This application is a continuation of my prior application Ser. No. 519,671, filed July 1, 1955, now abandoned.

I claim:

1. A Portland cement base composition consisting essentially of Portland cement as its principal constituent in a non-aqueous vehicle made up of a small amount of a water-insoluble resin which is non-reactive with the constituents of Portland cement and which is soluble in an organic solvent and which is dissolved in an organic solvent, the amount of resin in the vehicle being from about 1½% to about 5% of the weight of the inorganic constituents of the composition, of which at least about 80% is Portland cement, and being an amount sufficient to impart viscosity to produce a smooth working composition of painting consistency but insufficient to prevent hydration of the cement with water when the solvent is removed, the residue remaining after removal of the solvent containing at least about 95% inorganic constituents, said vehicle being present in sufficient amount to produce a composition of painting consistency which can be applied by conventional painting means.

2. A Portland cement base composition as defined in claim 1, in which the amount of resin is about 1½% to 2½% of the weight of the inorganic constituents, and in which the Portland cement is about 85% of the inorganic constituents.

3. The method of producing a non-aqueous cement base composition consisting essentially of Portland cement as its principal constituent, in a non-aqueous vehicle, which comprises dissolving, in an organic solvent, a water-insoluble resin which is non-reactive with the constituents of Portland cement and which is soluble in an organic solvent and incorporating inorganic material containing at least about 80% Portland cement in the resulting vehicle, the amount of resin being from about 1½% to about 5% of the weight of the inorganic material and an amount sufficient to impart viscosity to produce a smooth working composition of painting consistency but insufficient to prevent hydration of the cement when the solvent is removed, the residue remaining after the removal of the solvent being made up of at least about 95% inorganic material, said vehicle being present in sufficient amount to produce a composition of painting consistency which can be applied by conventional painting means.

4. The method of waterproofing concrete and masonry walls which comprises applying thereto a non-aqueous cement base composition as defined in claim 1, evaporating the solvent from the composition and applying water to hydrate and set the cement.

5. The method of producing a non-aqueous cement base composition consisting essentially of Portland cement as its principal constituent, in a non-aqueous vehicle, which comprises admixing inorganic material containing at least about 80% Portland cement with from about 1½% to about 5% of the weight of the inorganic material of a water-insoluble resin, which is not reactive with the constituents of Portland cement, to form a dry mix of the inorganic materials and resin, and adding to said dry mix an organic solvent to dissolve the resin to form the non-aqueous cement base composition, the amount of the resin being sufficient to impart viscosity to produce a smooth working composition of painting consistency but insufficient to prevent hydration of the cement when the solvent is removed, and the residue remaining after the removal of the solvent being made up of at least about 95% inorganic material, the amount of solvent used to dissolve the resin being sufficient in amount to produce a composition of painting consistency which can be applied by conventional painting means.

6. The method of waterproofing concrete and masonry walls which comprises applying thereto a non-aqueous cement base composition as defined in claim 2, evaporating the solvent from the composition and applying water to hydrate and set the cement.

7. Concrete and masonry walls waterproofed by the process of claim 4.

8. Concrete and masonry walls waterproofed by the process of claim 6.

References Cited in the file of this patent

UNITED STATES PATENTS

| | | |
|---|---|---|
| 1,374,161 | Hathaway | Apr. 5, 1921 |
| 1,991,007 | Bonney et al. | Feb. 12, 1935 |
| 2,309,185 | Gordon | Jan. 26, 1943 |
| 2,671,030 | Gobel et al. | Mar. 2, 1954 |
| 2,672,793 | Rowe et al. | Mar. 23, 1954 |
| 2,760,885 | Larsen | Aug. 28, 1956 |